(12) United States Patent
Bickham et al.

(10) Patent No.: US 9,804,326 B2
(45) Date of Patent: Oct. 31, 2017

(54) OPTICAL FIBER FOR MULTIMODE AND SINGLE-MODE TRANSMISSION

(71) Applicant: Corning Incorporated, Corning, NY (US)

(72) Inventors: Scott Robertson Bickham, Corning, NY (US); Dana Craig Bookbinder, Corning, NY (US); Ming-Jun Li, Horseheads, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/175,403

(22) Filed: Jun. 7, 2016

(65) Prior Publication Data

US 2016/0377801 A1    Dec. 29, 2016

Related U.S. Application Data

(60) Provisional application No. 62/183,252, filed on Jun. 23, 2015.

(51) Int. Cl.
| | | |
|---|---|---|
| *G02B 6/028* | (2006.01) | |
| *G02B 6/02* | (2006.01) | |
| *G02B 6/036* | (2006.01) | |
| *G02B 6/42* | (2006.01) | |

(Continued)

(52) U.S. Cl.
CPC ....... *G02B 6/0288* (2013.01); *G02B 6/02004* (2013.01); *G02B 6/0281* (2013.01); *G02B 6/02395* (2013.01); *G02B 6/0365* (2013.01); *G02B 6/03627* (2013.01); *G02B 6/42* (2013.01); *H04B 10/2581* (2013.01); *H04B 10/503* (2013.01)

(58) Field of Classification Search
CPC ........................ G02B 6/0288; G02B 6/0281; G02B 6/02395; G02B 6/0365; G02B 6/03627
See application file for complete search history.

(56) References Cited

U.S. PATENT DOCUMENTS

| | | |
|---|---|---|
| 2013/0243382 A1 | 9/2013 | Li |
| 2014/0064686 A1 | 3/2014 | Lars et al. |

FOREIGN PATENT DOCUMENTS

| | | |
|---|---|---|
| JP | 2014137588 A | 7/2014 |
| WO | 2015040447 A1 | 3/2015 |

OTHER PUBLICATIONS

International Search Report and Written Opinion PCT/US2016/038454 dated Sep. 8, 2016.
(Continued)

*Primary Examiner* — Jerry Rahll
(74) *Attorney, Agent, or Firm* — Kevin L. Bray

(57) ABSTRACT

A multimode coupling fiber for optical data links features low coupling loss to silicon photonics lasers, VCSELs, single mode transmission fibers, multimode transmission fibers, and high speed receivers. The coupling fiber includes a core, an optional inner cladding region, a depressed index cladding region, and an outer cladding region. The relative refractive index profile of the coupling fiber includes a core region with α profile and a depressed index cladding region that facilitates low bending loss and high bandwidth. The mode field diameter of the coupling fiber is well-matched to standard single mode transmission fibers and the etendue of the coupling fiber is high enough to couple efficiently to multimode transmission fibers.

20 Claims, 7 Drawing Sheets

(51) Int. Cl.
*H04B 10/2581* (2013.01)
*H04B 10/50* (2013.01)

(56) References Cited

OTHER PUBLICATIONS

Masayuki Iwase et al.: "Optical Components for High-Density Optical Inter-Connect System: OptoUnity®", Furukawa Electric Review No. 32 (2007), 26-33.

Ryuichi Sugizaki et al.: "Small Diameter Fibers for Optical Interconnection and Their Reliability", Proceedings of the 57 the IWCS, Nov. 2008, pp. 377-381.

Mitsuhiro Iwaya et al., "Develbpment of Optical Wiring for Optical Interconnects," Furukawa Electric Review No. 41 (2012), 1-5.

OPTICAL FIBER FOR MULTIMODE AND SINGLE-MODE TRANSMISSION

This application claims the benefit of priority under 35 U.S.C. §119 of U.S. Provisional Application Ser. No. 62/183,252 filed on Jun. 23, 2015 the content of which is relied upon and incorporated herein by reference in its entirety.

FIELD

The present description pertains to optical fibers for applications in integrated optical systems. More particularly, this description pertains to optical fibers designed for efficient coupling to chips and devices used in silicon photonics. Most specifically, this description pertains to multimode optical fibers that feature low bending losses and efficient coupling to light sources, waveguides, other fibers, and detectors used in the transmission and receiving of optical signals.

BACKGROUND

The need for greater bandwidth and higher data transmission rates has motivated efforts to develop next-generation platforms for information storage and delivery. It is widely believed that optical information systems will provide superior performance to today's microelectronics-based systems. Integrated optical systems based on silicon photonics are a leading replacement technology for microelectronic systems. Silicon photonics interfaces with standard CMOS technologies and WDM (wavelength division multiplexing) to convert electrical signals to optical signals, transmit optical signals, and reconvert optical signals to electrical signals. In disaggregated systems, transfer of signals between units occurs through optical links that provide high bandwidth and high data transfer rates.

Low-loss coupling between optical fibers and transceivers is a key challenge for data centers and high performance computing applications. In order to operate efficiently, losses in the transfer of optical signals to and from optical links and the devices used in integrated optical systems need to be minimized. Efficient coupling of optical signals is needed between the light sources, chips, waveguides, fiber, and receivers used in systems and links for delivering optical signals.

Of particular interest is efficient coupling of optical signals to components used in the silicon photonics technology platform. A typical optical data link in silicon photonics includes a light source formed in or on a silicon substrate that generates an optical signal embodying data, an optical fiber for transmitting the optical signal, and a detector for receiving the optical signal, where the detector is formed in or on a silicon substrate. The light source and detector are "on-chip" devices and efficient coupling of optical signals between the chips and the interconnected optical transmission fiber is needed to enable the technology platform. The chip containing the light source may be referred to herein as a transmitting chip and may also include devices for receiving electrical signals and converting electrical signals to optical signals. The chip containing the detector may be referred to herein as a receiving chip and may also include devices for converting optical signals to electrical signals.

A variety of techniques to improve coupling of optical fibers and transmitting and receiving chips have been proposed. Most techniques use lenses and light-steering elements to form an optical bridge between the transmission fiber and the transmitting and receiving chips used for optical data transmission. To date, however, progress has been limited and achieving coupling loss less than 2 dB has proven to be formidable challenge. There is a need for new techniques for improving coupling efficiency between components in optical information systems.

SUMMARY

A multimode coupling fiber for optical data links features low coupling loss to silicon photonics lasers, VCSELs, single mode transmission fibers, multimode transmission fibers, and high speed receivers. The coupling fiber improves the efficiency of coupling between transmission fibers and chips, light sources, and detectors used in systems for optical data processing and transmission. The coupling fiber also provides high bandwidth and low bending loss, making it suitable for use as a multimode transmission fiber. Of particular interest is use of the coupling fiber to achieve low loss coupling of transmission fibers to chip-based light sources and detectors.

The coupling fiber is a multimode fiber with a refractive index profile designed to maximize coupling efficiency to light sources, transmission fiber, and detectors. The coupling fiber includes a core, an optional inner cladding region, a depressed index cladding region, and an outer cladding region. The relative refractive index profile of the coupling fiber includes a core region with an α profile and a depressed index cladding region that facilitates low bending loss and high bandwidth. The mode field diameter of the coupling fiber is well-matched to standard single mode transmission fibers and the etendue of the coupling fiber is high enough to couple efficiently to multimode transmission fibers.

The present specification extends to:
A multimode optical fiber comprising:
a core region, said core region having an outer radius $r_1$ in the range from 10 μm to 20 μm, and a relative refractive index profile defined by the relationship:

$$\Delta_1(r) = \Delta_{1max}\left[1 - \left[\frac{r}{r_1}\right]^\alpha\right]$$

and
a cladding adjacent said core region, said cladding including a depressed index cladding region having an inner radius in the range from 11 μm to 20 μm, an outer radius $r_3$ in the range from 14 μm to 24 μm, and a relative refractive index $\Delta_3$ in the range from −0.8% to −0.1%;
wherein said core region and said cladding form a waveguide that supports a fundamental mode and at least one higher order mode at 1310 nm and said optical fiber has an effective modal bandwidth at 1310 nm of at least 1.5 GHz-km.

The present specification extends to:
A multimode optical fiber comprising:
a core region, said core region having an outer radius $r_1$ in the range from 10 μm to 20 μm, and a relative refractive index profile defined by the relationship:

$$\Delta_1(r) = \Delta_{1max}\left[1 - \left[\frac{r}{r_1}\right]^\alpha\right]$$

and a cladding adjacent said core region, said cladding including a depressed index cladding region having an inner radius in the range from 11 µm to 20 µm, an outer radius $r_3$ in the range from 14 µm to 24 µm, and a relative refractive index $\Delta_3$ in the range from −0.8% to −0.1%;

wherein said core region and said cladding form a waveguide that supports a fundamental mode and at least one higher order mode at 1550 nm and said optical fiber has an effective modal bandwidth at 1550 nm of at least 1.5 GHz-km.

The present specification extends to:

An optical data link comprising:

a transmitter, said transmitter including a light source, said light source providing light; and a first multimode optical fiber operably connected to said transmitter, said first multimode optical fiber receiving said light from said light source, said first multimode optical fiber comprising:

a core region, said core region having an outer radius $r_1$ in the range from 10 µm to 20 µm, and a relative refractive index profile defined by the relationship:

$$\Delta_1(r) = \Delta_{1max}\left[1 - \left[\frac{r}{r_1}\right]^\alpha\right]$$

and a cladding adjacent said core region, said cladding including a depressed index cladding region having an inner radius in the range from 11 µm to 20 µm, an outer radius $r_3$ in the range from 14 µm to 24 µm, and a relative refractive index $\Delta_3$ in the range from −0.8% to −0.1%;

wherein said core region and said cladding of said first multimode optical fiber form a waveguide that supports a fundamental mode and at least one higher order mode at 1310 nm and said optical fiber has an effective modal bandwidth at 1310 nm of at least 1.5 GHz-km.

The present specification extends to:

An optical data link comprising:

a transmitter, said transmitter including a light source, said light source providing light; and a first multimode optical fiber operably connected to said transmitter, said first multimode optical fiber receiving said light from said light source, said first multimode optical fiber comprising:

a core region, said core region having an outer radius $r_1$ in the range from 10 µm to 20 µm, and a relative refractive index profile defined by the relationship:

$$\Delta_1(r) = \Delta_{1max}\left[1 - \left[\frac{r}{r_1}\right]^\alpha\right]$$

and a cladding adjacent said core region, said cladding including a depressed index cladding region having an inner radius in the range from 11 µm to 20 µm, an outer radius $r_3$ in the range from 14 µm to 24 µm, and a relative refractive index $\Delta_3$ in the range from −0.8% to −0.1%;

wherein said core region and said cladding of said first multimode optical fiber form a waveguide that supports a fundamental mode and at least one higher order mode at 1550 nm and said optical fiber has an effective modal bandwidth at 1550 nm of at least 1.5 GHz-km.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present description, and together with the specification serve to explain principles and operation of methods, products, and compositions embraced by the present description. Features shown in the drawing are illustrative of selected embodiments of the present description and are not necessarily depicted in proper scale.

BRIEF DESCRIPTION OF THE DRAWINGS

While the specification concludes with claims particularly pointing out and distinctly claiming the subject matter of the written description, it is believed that the specification will be better understood from the following written description when taken in conjunction with the accompanying drawings, wherein:

The embodiments set forth in the drawings are illustrative in nature and not intended to be limiting of the scope of the detailed description or claims. Whenever possible, the same reference numeral will be used throughout the drawings to refer to the same or like feature.

DETAILED DESCRIPTION

Figure 1:
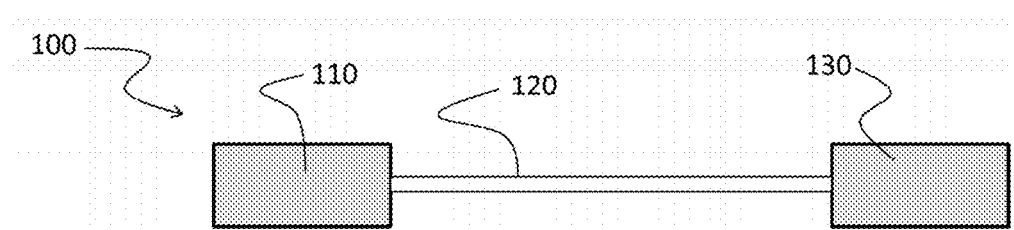
FIG. 1 depicts an optical data link that includes a transmitter, an optical transmission fiber, and a receiver.

Reference will now be made in detail to illustrative embodiments of the present description.

An explanation of selected terms as used herein is now provided:

Selected measurements reported herein may be expressed in units of microns or square microns. The unit "microns" may also be expressed as "µm" or "micron". Similarly, the unit "micron squared" may also be expressed as "µm$^2$", "micron$^2$" or "microns$^2$".

"Radial position" or the radial coordinate "r" refers to radial position relative to the centerline (r=0) of the fiber.

The "refractive index profile" is the relationship between refractive index or relative refractive index and fiber radius. For relative refractive index profiles depicted herein as having step boundaries between adjacent core and/or cladding regions, normal variations in processing conditions may preclude obtaining sharp step boundaries at the interface of adjacent regions. It is to be understood that although boundaries of refractive index profiles may be depicted herein as step changes in refractive index, the boundaries in practice may be rounded or otherwise deviate from perfect step function characteristics. It is further understood that the value of the relative refractive index may vary with radial position within the core region and/or any of the cladding regions. When relative refractive index varies with radial position in a particular region of the fiber (core region and/or any of the cladding regions), it may be expressed in terms of its actual or approximate functional dependence, or its value at a particular position within the region, or in terms of an average value applicable to the region as a whole. Unless otherwise specified, if the relative refractive index of a region (core region and/or any of the cladding regions) is expressed as a single value, it is understood that the relative refractive index in the region is constant, or approximately constant, and corresponds to the single value or that the single value represents an average value of a non-constant relative refractive index dependence with radial position in the region. Whether by design or a consequence of normal manufacturing variability, the dependence of relative refractive index on radial position may be sloped, curved, or otherwise non-constant.

"Relative refractive index," as used herein, is defined in Eq. 1 as:

$$\Delta_i(r_i) \% = 100 \frac{(n_i^2 - n_{ref}^2)}{2n_i^2} \qquad \text{Eq. 1}$$

where $n_i$ is the refractive index at radius $r_i$, unless otherwise specified, and $n_{ref}$ is the refractive index of pure silica glass, unless otherwise specified. Accordingly, as used herein, the relative refractive index percent is relative to pure silica glass. As used herein, the relative refractive index is represented by $\Delta$ (or "delta") or $\Delta\%$ (or "delta %) and its values are given in units of "%", unless otherwise specified. Relative refractive index may also be expressed as $\Delta(r)$ or $\Delta(r)\%$.

The average relative refractive index ($\Delta_{ave}$) of a region of the fiber is determined from Eq. 2:

$$\Delta_{ave} = \int_{r_{inner}}^{r_{outer}} \frac{\Delta(r)\, dr}{(r_{outer} - r_{inner})} \qquad \text{Eq. 2}$$

where $r_{inner}$ is the inner radius of the region, $r_{outer}$ is the outer radius of the region, and $\Delta(r)$ is the relative refractive index of the region.

The term "α-profile" refers to a relative refractive index profile $\Delta(r)$ that has the functional form defined in Eq. 3:

$$\Delta(r) = \Delta(r_0)\left[1 - \left[\frac{|r - r_0|}{(r_z - r_0)}\right]^\alpha\right] \qquad \text{Eq. 3}$$

where $r_o$ is the radial position at which $\Delta(r)$ is maximum, $\Delta(r_0) > 0$, $r_z > r_0$ is the radial position at which $\Delta(r)$ is zero, and r is in the range $r_i \leq r \leq r_f$, where $r_i$ is the initial radial position of the α-profile, $r_f$ is the final radial position of the α-profile, and α is a real number. $\Delta(r_0)$ for an α-profile may be referred to herein as $\Delta_{max}$ or, when referring to a specific region i of the fiber, as $\Delta_{i,max}$. When the relative refractive index profile of the fiber core region is described by an α-profile with $r_0$ occurring at the centerline (r=0) and $r_z$ corresponding to the outer radius $r_1$ of the core region, Eq. 3 simplifies to Eq. 3':

$$\Delta_1(r) = \Delta_{1max}\left[1 - \left[\frac{r}{r_1}\right]^\alpha\right] \qquad \text{Eq. 3'}$$

The "etendue" of an optical fiber is defined in Eq. 4 as:

$$\text{Etendue} = (\pi r_1^2)(NA)^2 \qquad \text{Eq. 4}$$

where $r_1$ is the core radius of the fiber and NA is the numerical aperture of the fiber.

The term "mode" refers to guided mode. A single-mode fiber is an optical fiber designed to support only a single mode over a substantial length of the optical fiber (e.g., at least several meters), but that under certain circumstances can support multiple modes over short distances (e.g., tens of millimeters). A multimode optical fiber is an optical fiber designed to support the fundamental mode and at least one higher-order mode over a substantial length of the optical fiber.

The operating wavelength λ of the coupling fiber is the wavelength at which the coupling fiber is operated. The operating wavelength corresponds to the wavelength of a guided mode. Representative operating wavelengths include 1310 nm and 1550 nm, which are commonly used in telecommunications systems and optical data links that include coupling fibers of the type disclosed herein. Although a particular operating wavelength may be specified for a coupling fiber, it is understood that a particular coupling fiber can operate at multiple operating wavelengths and/or over a continuous range of operating wavelengths. Characteristics such as bandwidth and mode field diameter may vary with the operating wavelength and the relative refractive index profile of a particular coupling fiber may be designed to provide optimal performance at a particular operating wavelength, a particular combination of operating wavelengths, or particular continuous range of operating wavelengths.

The "mode field diameter" or "MFD" of an optical fiber is defined in Eq. 5 as:

$$MFD = 2w \qquad \text{Eq. 5}$$

$$w^2 = 2\frac{\int_0^\infty (f(r))^2 r\,dr}{\int_0^\infty \left(\frac{df(r)}{dr}\right)^2 r\,dr}$$

where $f(r)$ is the transverse component of the electric field distribution of the guided optical signal and r is radial position in the fiber. "Mode field diameter" or "MFD" depends on the wavelength of the optical signal and is reported herein for wavelengths of 1310 nm and 1550 nm. Specific indication of the wavelength will be made when referring to mode field diameter herein. Unless otherwise specified, mode field diameter refers to the $LP_{01}$ mode at the specified wavelength.

The splice loss between two optical fibers can be estimated based on the overlap integral of optical field amplitudes of the LP01 modes in the interconnected fibers using the following equation, $$\text{Loss (dB)} = -10\log_{10}[\iint \phi_1(r,\theta)\phi_2(r,\theta)dr d\theta]^2,$$

where $\phi_1$ is the optical field amplitude of the first fiber and $\phi_2$ is the optical field amplitude of the second fiber. For the evaluation of coupling loss to single-mode fiber, we assume that the single-mode fiber has a rounded step index core with an alpha of 12, a radius of 4.7 μm and a maximum relative refractive index of 0.35%. The optical field amplitudes for refractive index profiles of this single mode fiber and the optical fibers such as those described herein can be calculated using one of several commercially available software packages such as Optiwave, BeamPROP or VPIphotonics.

The present coupling fibers include a core region and a cladding region surrounding the core region. The cladding region may include an inner cladding region and an outer cladding region. The cladding may further include a depressed index cladding region. The depressed index cladding region is a cladding region having a lower relative refractive index than adjacent inner and/or outer cladding region(s). The depressed index cladding region may also be referred to herein as a trench or trench region. The depressed index cladding region may surround an inner cladding region and/or may be surrounded by an outer cladding region. The depressed index cladding region may contribute to a reduction in bending losses.

Whenever used herein, radius $r_1$ and relative refractive index $\Delta_1(r)$ refer to the core region, radius $r_2$ and relative refractive index $\Delta_2(r)$ refer to the inner cladding region, radius $r_3$ and relative refractive index $\Delta_3(r)$ refer to the depressed index cladding region, radius $r_4$ and relative refractive index $\Delta_4(r)$ refer to the outer cladding region, and radius $r_5$ refers to the coating. It is understood that the central core region is substantially cylindrical in shape and that the surrounding inner cladding, depressed index cladding, outer cladding regions, and coating are substantially annular in shape. Annular regions may be characterized in terms of an inner radius and an outer radius. Radial positions $r_1$, $r_2$, $r_3$, $r_4$, and $r_5$ refer herein to the outermost radii of the core region, inner cladding region, depressed index cladding region, outer cladding region, and coating, respectively.

When two regions are directly adjacent to each other, the outer radius of the inner of the two regions coincides with the inner radius of the outer of the two regions. In one embodiment, for example, the fiber includes a depressed index cladding region surrounded by and directly adjacent to an outer cladding region. In such an embodiment, the radius $r_3$ corresponds to the outer radius of the depressed index cladding region and the inner radius of the outer cladding region. In embodiments in which the relative refractive index profile includes a depressed index cladding region adjacent to an inner cladding region, the radial position $r_2$ corresponds to the outer radius of the inner cladding region and the inner radius of the depressed index cladding region. In embodiments in which the relative refractive index profile includes a depressed index cladding region directly adjacent to the core, the radial position $r_1$ corresponds to the outer radius of the core and the inner radius of the depressed index cladding region.

The following terminology applies to embodiments in which the relative refractive index profile includes an inner cladding region. The difference between radial position $r_2$ and radial position $r_1$ may be referred to herein as the thickness of the inner cladding region. The difference between radial position $r_3$ and radial position $r_2$ may be referred to herein as the thickness of the depressed index cladding region. The difference between radial position $r_4$ and radial position $r_3$ may be referred to herein as the thickness of the outer cladding region.

The following terminology applies to embodiments in which the relative refractive index profile lacks an inner cladding region. The difference between radial position $r_3$ and radial position $r_1$ may be referred to herein as the thickness of the depressed index cladding region. The difference between radial position $r_4$ and radial position $r_3$ may be referred to herein as the thickness of the outer cladding region.

As will be described further hereinbelow, the relative refractive indices of the core region, inner cladding region, depressed index cladding region, and outer cladding region may differ. Each of the regions may be formed from silica glass or a silica-based glass. Variations in refractive index may be accomplished by incorporating updopants or downdopants at levels designed to provide a targeted refractive index or refractive index profile using techniques known to those of skill in the art. Updopants are dopants that increase the refractive index of the glass relative to the undoped glass composition. Downdopants are dopants that decrease the refractive index of the glass relative to the undoped glass composition. In one embodiment, the undoped glass is pure silica glass. When the undoped glass is pure silica glass, updopants include Cl, Br, Ge, Al, P, Ti, Zr, Nb, and Ta, and downdopants include F and B. Regions of constant refractive index may be formed by not doping or by doping at a uniform concentration. Regions of variable refractive index may be formed through non-uniform spatial distributions of dopants The coupling fiber may also include a primary coating surrounding the cladding region, and a secondary coating surrounding the primary coating. The primary and secondary coatings may be selected to protect the mechanical integrity of the core and cladding and to minimize the effects of external mechanical disturbances on the characteristics of the optical signal guided in the fiber. The primary and secondary coatings may insure that losses due to bending and other perturbing forces are minimized.

The coupling fiber may only include a single coating surrounding the cladding region. The coating may be selected to protect the mechanical integrity of the core and cladding and to minimize the effects of external mechanical disturbances on the characteristics of the optical signal guided in the fiber. The coating may also insure that losses due to bending and other perturbing forces are minimized.

The present description provides a coupling fiber that improves the efficiency of coupling between transmission fibers and chips, light sources, and detectors used in systems for optical data processing and transmission. The coupling fiber also provides high bandwidth and low bending loss, making it suitable for use as a multimode transmission fiber.

The coupling fiber is a multimode fiber with a refractive index profile designed to maximize coupling efficiency to light sources, transmission fiber, and detectors. Of particular interest is use of the coupling fiber to achieve low loss coupling of transmission fibers to chip-based light sources and detectors.

FIG. 1 illustrates a representative optical data link that can be used for data transmission in data centers, high performance computing, and other applications. Optical data link 100 includes transmitter 110, transmission fiber 120, and receiver 130. Transmitter 110 includes a light source that generates an optical signal. The optical signal embodies, encodes or otherwise represents information or data. Light sources include lasers and diodes. Representative light sources include silicon photonics lasers and VCSELs (vertical cavity surface emitting lasers). In one embodiment, transmitter 110 is implemented as a chip, such as a silicon chip compatible with the silicon photonics technology platform. Transmitter 110 may also include devices for receiving electrical signals and configuring the light source to produce optical signal(s) corresponding to electrical signal(s).

Transmission fiber 120 is interconnected with transmitter 110 and receives the optical signal produced by the light source. Transmission fiber 120 may receive the optical signal directly from the light source. Alternatively, the light source may be coupled to a waveguide (e.g. an on-chip waveguide) and the waveguide may be coupled to transmission fiber 120. Transmission fiber 120 delivers the optical signal to receiver 130. Transmission fiber 120 may be a single mode fiber or a multimode fiber. In one embodiment, transmission fiber 120 is a silica-based fiber that includes a higher index silica-based core and a lower index silica-based cladding.

Receiver 130 receives the optical signal from transmission fiber 120. Receiver 130 includes a detector, such as a photodetector, that provides an output characteristic of the optical signal. The detector is responsive to the wavelength(s) of the optical signal. The detector may convert the optical signal to an electrical signal having a current or voltage proportional to or otherwise characteristic of the optical signal. In one embodiment, receiver 130 is implemented as a chip, such as a silicon chip compatible with the silicon photonics technology platform. The receiver 130 may receive the signal directly from transmission fiber 120 or indirectly from transmission fiber 120 via a waveguide (e.g. an on-chip waveguide).

In the optical data link shown in FIG. 1, transmitter 110 produces light, transmission fiber 120 is operably connected to transmitter 110 and receives the light produced by transmitter 110, and receiver 130 is operably connected to transmission fiber 120 and receives the light from transmission fiber 120.

In order to be a viable commercial technology, optical data links need to efficiently generate, transmit, and detect optical signals. Loss of optical signal intensity is particularly problematic at the junction between the transmitter and transmission fiber and at the junction between the transmission fiber and the receiver. Important considerations include efficient coupling of the light source to the transmission fiber and efficient coupling of the transmission fiber to the detector.

Figure 2:
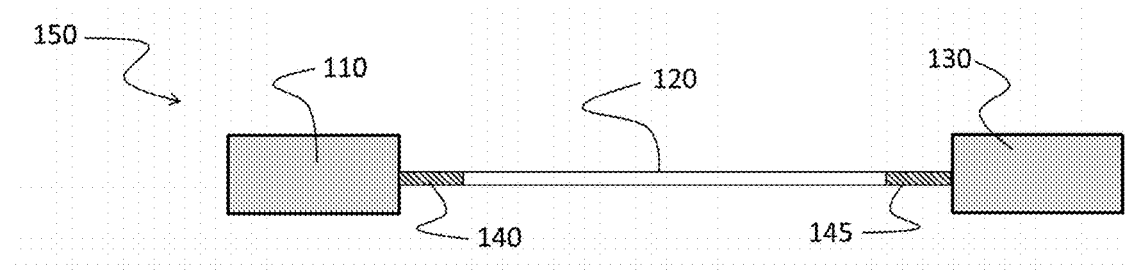
FIG. 2 depicts an optical data link that includes a transmitter, an optical transmission fiber, a receiver, and two coupling fibers.

The present disclosure provides a coupling fiber that facilitates efficient transfer of optical signals from light source to transmission fiber and from transmission fiber to detector. The coupling fiber can be inserted at the junction between light source (or transmitter) and transmission fiber and/or at the junction between the transmission fiber and detector (or receiver). FIG. 2 shows an embodiment in which coupling fibers are inserted in the optical data link at each of the junctions. Optical data link 150 includes transmitter 110, transmission fiber 120, receiver 130, coupling fiber 140 and coupling fiber 145. Coupling fiber 140 is positioned between transmitter 110 and transmission fiber 120 and promotes efficient coupling of light from a light source of transmitter 110 to transmission fiber 120. Coupling fiber 145 is positioned between transmission fiber 120 and receiver 130 and promotes efficient coupling of light from transmission fiber 120 to a detector of receiver 130.

In the optical data link shown in FIG. 2, transmitter 110 includes a light source and produces light, coupling fiber 140 is operably connected to transmitter 110. Coupling fiber 140 receives the light produced by transmitter 110 and transmits it to transmission fiber 120. Transmission fiber 120 is operably connected to coupling fiber 140, receives the light transmitted by coupling fiber 140 and transmits it to coupling fiber 145. Coupling fiber 145 is operably connected to transmission fiber 120. Coupling fiber 145 receives the light transmitted by transmission fiber 120 and transmits it to receiver 130. Receiver 130 is operably connected to coupling fiber 145 and receives the light transmitted by coupling fiber 145.

Figure 3:
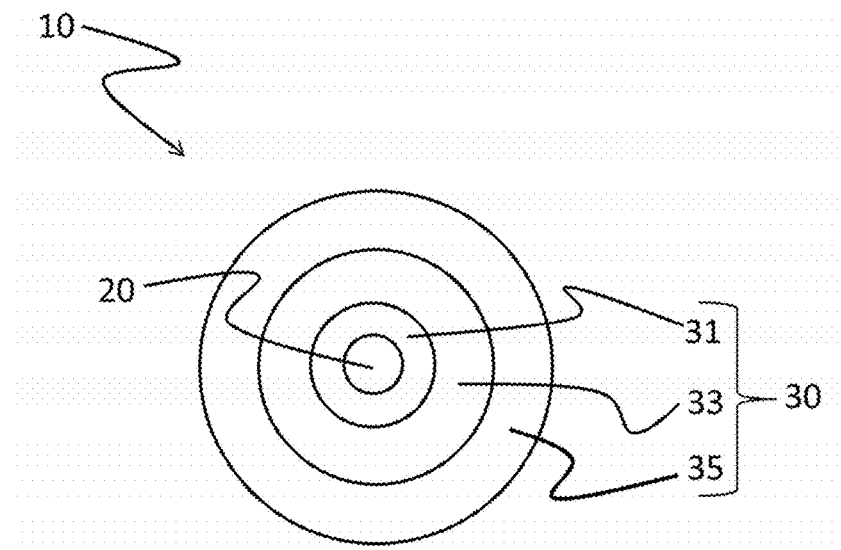
FIG. 3 depicts a cross-sectional view of a coupling fiber having a core region, an inner cladding region, a depressed index cladding region, and an outer cladding region.
Figure 4:
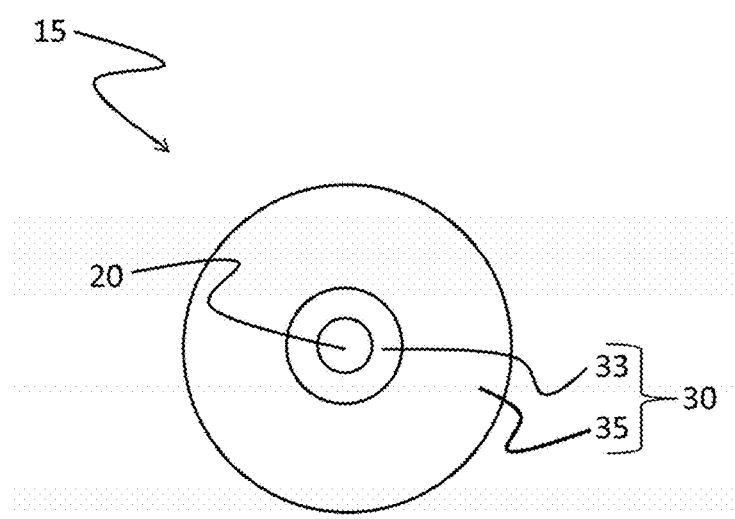
FIG. 4 depicts a cross-sectional view of a coupling fiber having a core region, a depressed index cladding region, and an outer cladding region.

A schematic cross-sectional depiction of the glass portion of a coupling fiber in accordance is shown in FIG. 3. Coupling fiber 10 includes core region 20 and cladding region 30. Cladding region 30 includes inner cladding region 31, depressed index cladding region 33, and outer cladding region 35. Inner cladding region 31 is optional and may be omitted as shown for fiber 15 in FIG. 4. Coupling fibers 10 and 15 may also include one or more coatings, such as a primary coating and a secondary coating.

In one embodiment, the coupling fiber includes a core surrounded by an inner cladding region, a depressed index cladding region surrounding the inner cladding regions, and an outer cladding region surrounding the depressed index cladding region. The inner cladding region may be directly adjacent to the core, the depressed index cladding region may be directly adjacent to the inner cladding region, and the outer cladding region may be directly adjacent to the depressed index cladding region. In another embodiment, the coupling fiber lacks an inner cladding region and includes a depressed index cladding region surrounding a core and an outer cladding region surrounding the depressed index cladding region. The depressed index cladding region may be directly adjacent to the core region, and the outer cladding region may be directly adjacent to the depressed index cladding region.

Figure 5:
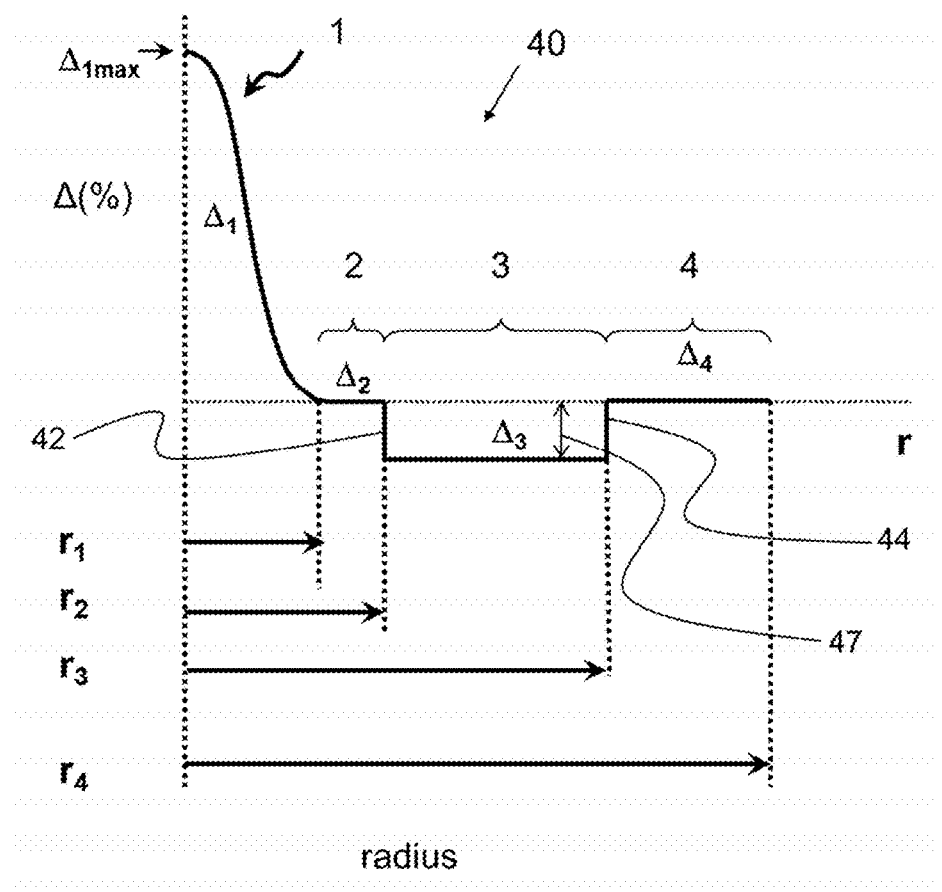
FIG. 5 depicts the relative refractive index profile of a coupling fiber having a core region, an inner cladding region, a depressed index cladding region, and an outer cladding region.

A representative relative refractive index profile for the glass portion (core and cladding regions) of a coupling fiber is presented in FIG. 5. FIG. 5 shows a rectangular trench profile for a coupling fiber 40 having a core region (1) with outer radius $r_1$ and relative refractive index $\Delta_1$, an inner cladding region (2) extending from radial position $r_1$ to radial position $r_2$ and having relative refractive index $\Delta_2$, a depressed index cladding region (3) extending from radial position $r_2$ to radial position $r_3$ and having relative refractive index $\Delta_3$, and an outer cladding region (4) extending from radial position $r_3$ to radial position $r_4$ and having relative refractive index $\Delta_4$. In the profile of FIG. 5, the depressed index cladding region (3) may be referred to herein as a trench and may have a constant refractive index that is less than the refractive indices of the inner cladding region (2) and the outer cladding region (4). Core region (1) has the highest relative refractive index in the profile. Core region (1) may include a lower index region at or near the centerline (known in the art as a "centerline dip") (not shown). It should be noted that the inner cladding region (2) is optional and may be eliminated as noted hereinabove. When inner cladding region (2) is missing, depressed index cladding region (3) is directly adjacent core region (1) as shown for coupling fiber 45 in FIG. 6.

Figure 6:
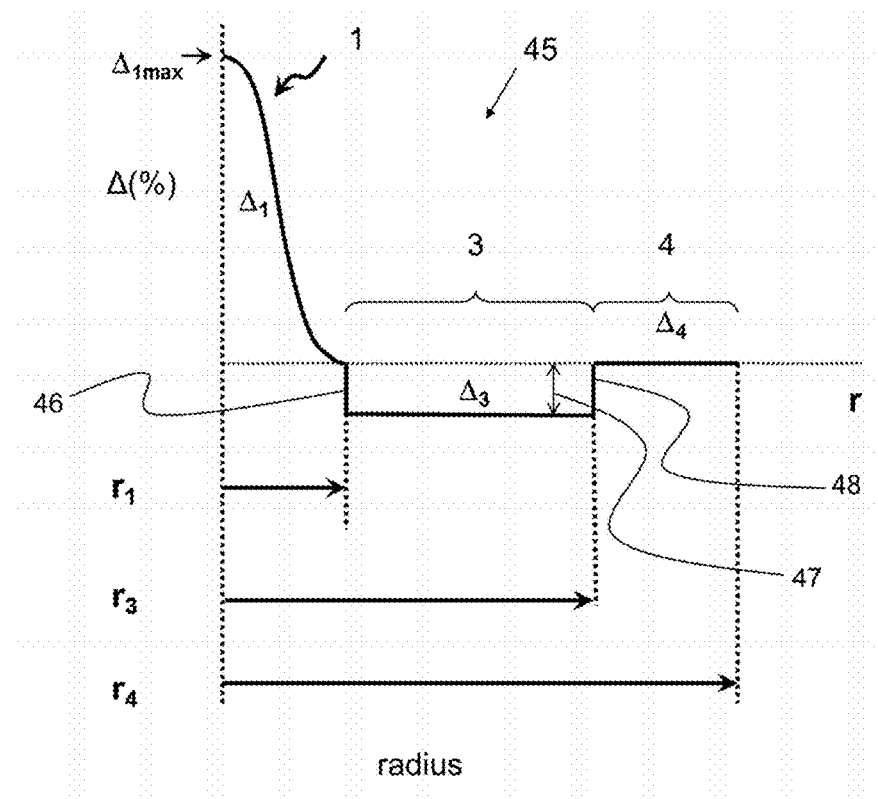
FIG. 6 depicts a relative refractive index profile of a coupling fiber having a core region, a depressed index cladding region, and an outer cladding region.

In the embodiments shown in FIGS. 5 and 6, the core region of the coupling fiber has a relative refractive index described by an $\alpha$-profile. The radial position $r_0$ (corresponding to $\Delta_{1max}$) of the $\alpha$-profile may correspond to the centerline (r=0) of the fiber or a radial position near the centerline of the fiber and the radial position $r_z$ of the $\alpha$-profile may correspond to the core radius $r_1$.

In FIG. 5, transition region 42 from inner cladding region (2) to depressed index cladding region (3) and transition region 44 from depressed index cladding region (3) to outer cladding region (4) are shown as step changes. It is to be understood that a step change is an idealization and that transition region 42 and transition region 44 may not be strictly vertical in practice as indicated in FIG. 5. Instead, transition region 42 and transition region 44 may have a slope or curvature. When transition region 42 and transition region 44 are non-vertical, the inner radius $r_2$ and outer radius $r_3$ of depressed index cladding region (3) correspond to the mid-points of transition regions 42 and 44, respectively. The mid-points correspond to half of the depth 47 of the depressed index cladding region (3). An analogous interpretation applies to fiber 45 shown in FIG. 6 when transition regions 46 and 48 are sloped or curved.

The relative ordering of relative refractive indices $\Delta_1$, $\Delta_2$, $\Delta_3$, and $\Delta_4$ in the relative refractive index profile shown in FIG. 5 satisfy the conditions $\Delta_{1max} > \Delta_4 > \Delta_3$ and $\Delta_{1max} > \Delta_2 > \Delta_3$. The values of $\Delta_2$ and $\Delta_4$ may be equal or either may be greater than the other, but both $\Delta_2$ and $\Delta_4$ are between $\Delta_{1max}$ and $\Delta_3$. The relative ordering of relative refractive indices $\Delta_1$, $\Delta_3$, and $\Delta_4$ in the relative refractive index profile shown in FIG. 6 satisfy the conditions $\Delta_{1max} > \Delta_4 > \Delta_3$.

The relative refractive index profiles of the coupling fibers have been designed to optimize coupling efficiency in optical data links. Selected characteristics relevant to efficient coupling for light sources, transmission fibers, and detectors in common use in optical data links are now described. Following discussion of these characteristics, exemplary relative refractive index profiles and parameters for coupling fibers that provide efficient optical coupling are presented.

Single mode and multimode VCSELs (vertical cavity surface emitting lasers) are attractive light sources for silicon photonics applications. Single mode VCSELs typically have a numerical aperture (NA) in the 0.10-0.15 range, a spot size with a diameter of 10 μm, and an etendue of a few square microns. Multimode VCSELs typically have a numerical aperture (NA) in the 0.20-0.30 range, a spot size with a diameter in the 10-30 μm range, and an etendue on the order of 10 μm². The numerical aperture and spot size of single mode and multimode VCSELs match well with common single mode and multimode transmission fibers, respectively, but coupling losses depend critically on alignment and precise alignment of VCSELs with single mode fibers is challenging.

Silicon photonics lasers are multimode light sources that have numerical aperture (NA) as high as 0.4, spot sizes with diameters in the 4-10 μm range, and an etendue of a few square microns. Like VCSELs, the optical parameters of silicon photonics lasers are consistent with efficient coupling to common multimode transmission fibers, subject to alignment constraints. Sensitivity to angular misalignments is typically high due to the high NA of the silicon photonic waveguide.

Single mode transmission fibers typically have a core diameter of 8 μm at 1310 nm and a numerical aperture (NA) of 0.12 at 1310 nm. Multimode transmission fibers typically have a core diameter of ~50 μm, a numerical aperture (NA) of 0.20, and an etendue of ~75 μm².

High speed optical receivers for operation at 25 Gb/s or higher typically include Ge photodiodes (p-i-n devices), which typically have apertures for receiving light in the range from 25-35 μm. When Ge photodiodes are implemented in optical data links with standard 50 μm multimode transmission fibers, overfilling of aperture of Ge photodiodes becomes a concern. Overfilling not only leads to high coupling losses, also to back reflections that have the potential to damage the light source.

The present coupling fibers have relative refractive index profiles designed for efficient coupling to the light sources, transmission fibers, and detectors typically included in optical data links. The coupling fibers are multimode fibers with high numerical aperture (NA), a core diameter intermediate between typical core diameters of single mode and multimode transmission fibers, and high bandwidth. The mode field diameter (MFD) of the coupling fibers is closely matched to single mode transmission fibers to minimize coupling losses to single mode fibers and at the same time, the etendue of the coupling fibers is high enough to couple efficiently to multimode transmission fibers. The ability to provide low loss coupling to both single-mode and multimode fibers enables the coupling fibers to be used in either the single-mode or multimode regime. The high etendue and high numerical aperture (NA) of the coupling fibers insures efficient coupling to single mode VCSELs, multimode VCSELS, single mode silicon photonics lasers and multimode silicon photonics lasers. The core diameter of the coupling fiber is sufficiently small to minimize overfilling of the aperture of high speed Ge photodetectors. The coupling fiber also features high bandwidth, which enables it to be used as a multimode transmission fiber.

The relative refractive index profiles of the coupling fibers include a depressed-index cladding region. The depressed-index cladding region assists in reducing bending losses and also promotes high bandwidth by reducing time delays of different mode groups. The relative refractive index profile of the coupling fibers may be of the form shown in FIGS. 5 and 6.

In one embodiment, the relative refractive index of the core of the coupling fiber is described by an $\alpha$-profile with an $\alpha$ value in the range from 1.8-3.0, or in the range from 1.85 to 3.0, or in the range from 1.85-2.5, or in the range from 1.9-2.3, or in the range from 1.95-2.2, or in the range from 1.9-2.05, or in the range from 1.95-2.05. The outer radius $r_1$ of the core may be in the range from 8 μm-22 μm, or in the range from 10 μm-20 μm, or in the range from or in the range from 11 μm-19 μm, or in the range from 12 μm-18 μm, or in the range from 13 pin 17 μm.

The maximum relative refractive index $\Delta_{1max}$ in the core may be in the range from 0.9%-2.8%, or in the range from 1.2%-2.6%, or in the range from 1.5%-2.4%, or in the range from 1.6%-2.2%, or in the range from 1.7%-2.1%, or in the range from 1.8%-2.1%, or in the range from 1.85%-2.05%, or in the range from 1.85%-1.95%.

In embodiments in which the relative refractive index profile includes an inner cladding region, the relative refractive index $\Delta_2$ may be in the range from −0.2% to 0.2%, or in the range from −0.15% to 0.15%, or in the range from −0.1% to 0.1%, or in the range from −0.05% to 0.05%. The thickness $r_2$-$r_1$ of the inner cladding region may be in the range from 0.5 μm-3.5 μm, or in the range from 0.7 μm-2 μm, or in the range from 0.7 μm-1.5 μm.

The relative refractive index $\Delta_3$ of the depressed index cladding region may be in the range from −1.0% to −0.1%, or in the range from −0.8% to −0.1%, or in the range from −0.7% to −0.2%, or in the range from −0.6% to −0.3%, or in the range from −0.5% to −0.3%.

The inner radius $r_1$ (in embodiments in which the depressed index cladding region is directly adjacent to a core) or $r_2$ (in embodiments in which the depressed index cladding region is directly adjacent to an inner cladding region) of the depressed index cladding region may be in the range from 11 μm-20 pin, or in the range from 12 μm-19 μm, or in the range from or in the range from 13 μm-18 μm, or in the range from 14 μm-17 μm. The outer radius $r_3$ of the depressed index cladding region may be in the range from 14 μm-24 μm, or in the range from 15 μm-23 μm, or in the range from or in the range from 16 μm-22 μm, or in the range from 17 μm-21 μm, or in the range from 18 μm-20 μm. The thickness $r_3$-$r_2$ (in embodiments in which the depressed index cladding region is directly adjacent to an inner cladding region) or $r_3$ $r_1$ (in embodiments in which the depressed index cladding region is directly adjacent to a core) of the depressed index cladding region may be in the range from 2 μm-8 μm, or in the range from 2 μm-7 μm, or in the range from or in the range from 3 μm-7 μm, or in the range from 3 μm-6 μm, or in the range from 3 μm-5 μm.

The relative refractive index $\Delta_4$ of the outer cladding region may be in the range from −0.2% to 0.2%, or in the range from −0.15% to 0.15%, or in the range from −0.1% to 0.1%, or in the range from −0.05% to 0.05%. The outer radius $r_4$ of the outer cladding region may be less than 60 μm, or less than 55 μm, or less than 50 μm, or less than 45 μm, or in the range from 35-60 μm, or in the range from 35 μm-55 μm, or in the range from 35 μm-50 μm, or in the range from 35 μm-45 μm. The thickness $r_4$-$r_3$ of the outer cladding region may be in the range from 10 μm-50 μm, or in the range from 15 μm-40 μm, or in the range from 15 μm-30 μm, or in the range from 15 μm-25 μm.

Representative Examples of relative refractive index profiles for the coupling fiber are summarized in Tables 1A, 2A, and 3A. The illustrative Examples of the coupling fiber are multimode fibers. The illustrative Examples given in Tables 1A and 2A are designed to provide high bandwidth at an operating wavelength of 1310 nm and the illustrative Examples given in Table 3A are designed to provide high bandwidth at an operating wavelength of 1550 nm. Table 1A also includes characteristics of a typical single mode transmission fiber and a comparative coupling fiber. The comparative coupling fiber is a multimode fiber that lacks a depressed index cladding region.

The illustrative Examples are based on a relative refractive index profile similar to the profile shown in FIG. 6. The relative refractive index profiles of the illustrative Examples included a core region with an α-profile, a depressed index cladding region and an outer cladding region. The relative refractive index profiles of the illustrative Examples differed from the profile shown in FIG. 6 in that the transition region between the core and depressed index cladding region and the transition region between the depressed index cladding region and the outer cladding region were sloped.

The following characteristics of the relative refractive index profile are included in Tables 1A, 2A, and 3A: $\Delta_{1max}$, expressed in units of %, corresponds to the maximum value of relative refractive index for the α-profile in the core region. For the illustrative Examples presented, $\Delta_{1max}$ occurs at the centerline (r=0) position of the coupling fiber. $r_1$, expressed in units of microns, is the outer radial position of the core region. For the illustrative Examples presented, $r_1$ corresponds to $r_2$, the radial position of the core α-profile at which Δ=0. α corresponds to the value of α for the relative refractive index profile of the core. $r_1'$, expressed in units of microns, corresponds to the inner radius of the depressed index cladding region. $r_3$, expressed in units of microns, corresponds to the outer radius of the depressed index cladding region. $\Delta_3$ is the relative refractive index of the depressed index cladding region. For the illustrative Examples presented, the depressed index cladding region has an approximately constant relative refractive index value between the transition regions with the core region and outer cladding regions. $\Delta_4$ is the relative refractive index of the outer cladding region and $r_4$ is the outer radius of the outer cladding region and is equal to 40.0 μm in each of the modeled examples, but can have any value in the range from 35 μm to 62.5 μm without affecting any of the disclosed optical characteristics.

Because the transition region from the core region to the depressed index cladding region is sloped, the inner radius $r_1'$ of the depressed index cladding region differs from the outer radius $r_1$ of the core region. $r_1'$ is selected as the radial position corresponding to half of the depth of the depressed index cladding region. Similarly, the outer radius $r_3$ of the depressed index cladding region is selected as the radial position corresponding to half of the depth of the depressed index cladding region. For the illustrative Examples presented, the depth of the depressed index cladding region is $\Delta_3$ and the radial position corresponding to half depth is the radial position corresponding to ½$\Delta_3$. $r_1'$ is the position of half depth adjacent the core region and $r_3$ is the position of half depth adjacent the outer cladding region.

Figure 7:
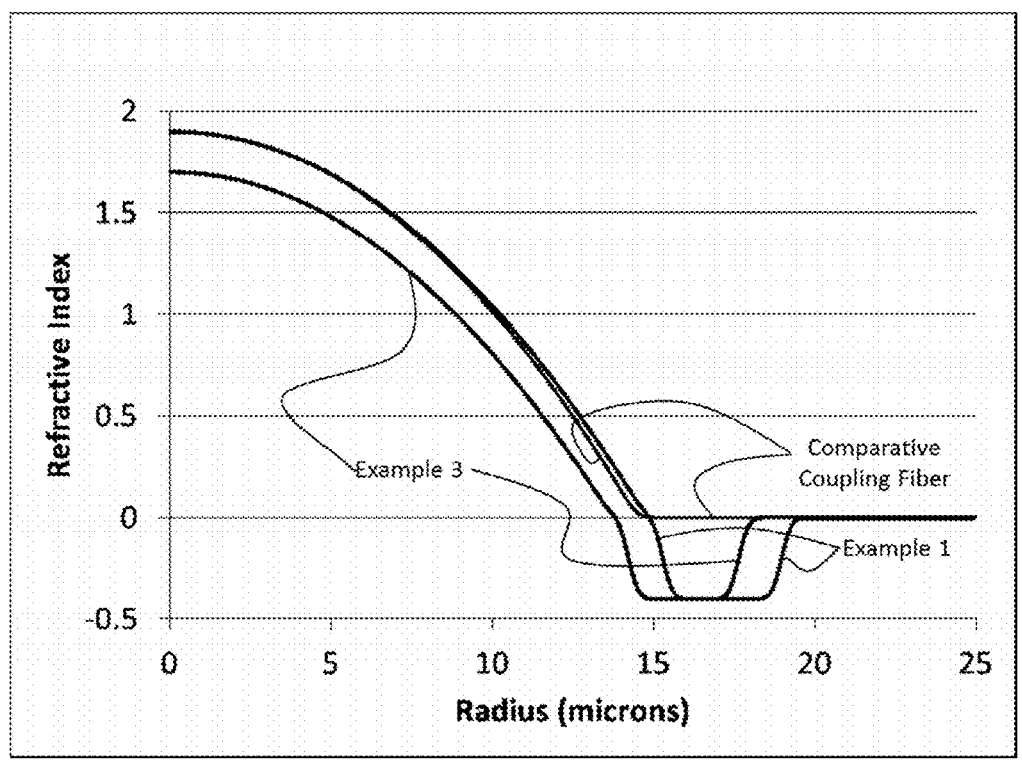
FIG. 7 depicts the relative refractive index profile of a comparative coupling fiber and two selected coupling fibers in accordance with the present specification.

FIG. 7 depicts the relative refractive index profiles of illustrative Examples 1 and 3 along with the relative refractive index profile of the Comparative Coupling Fiber described in Table 1A. The sloped transition regions from the core region to the depressed index cladding region and from the depressed index cladding region to the outer cladding region for illustrative Examples 1 and 3 are evident. As noted, the Comparative Coupling Fiber lacks a depressed index cladding region.

Tables 1B, 2B, and 3B summarize modeled performance characteristics for the fibers having the relative refractive index profile parameters listed in Tables 1A, 2A, and 3A, respectively. The performance characteristics include effective modal bandwidth (EMB) (expressed in units of GHz-km) at various indicated wavelengths, numerical aperture (NA), mode field diameter (MFD) (expressed in units of microns) for the LP01 mode at various indicated wavelengths, and etendue (expressed in units of $\mu m^2$).

TABLE 1A

Relative Refractive Index Characteristics of Illustrative Coupling Fibers

|  | Single Mode Fiber | Comparative Coupling Fiber | Examples 1 | Examples 2 | Examples 3 |
|---|---|---|---|---|---|
| $\Delta_{1max}$ (%) | 0.35 | 1.9 | 1.9 | 1.8 | 1.7 |
| $r_1$ (μm) | 4.70 | 14.49 | 14.74 | 14.12 | 13.68 |
| α | 12 | 2.057 | 2.035 | 2.033 | 2.031 |
| $\Delta_3$ (%) | N/A | N/A | −0.4 | −0.4 | −0.4 |
| $r_1'$ (μm) | N/A | N/A | 15.28 | 14.65 | 14.22 |
| $r_3$ (μm) | N/A | N/A | 18.97 | 18.18 | 17.65 |
| $\Delta_4$ (%) | 0 | 0 | 0 | 0 | 0 |
| $r_4$ (μm) | 62.5 | 62.5 | 40.0 | 40.0 | 40.0 |

TABLE 1B

Performance Characteristics of Illustrative Coupling Fibers

|  | Single Mode Fiber | Comparative Coupling Fiber | Examples 1 | Examples 2 | Examples 3 |
|---|---|---|---|---|---|
| EMB at 1270 nm (GHz-km) |  | 1.23 | 5.43 | 5.92 | 5.98 |
| EMB at 1290 nm (GHz-km) |  | 0.98 | 10.72 | 12.46 | 11.81 |
| EMB at 1310 nm (GHz-km) |  | 1.08 | 26.71 | 38.23 | 44.03 |
| EMB at 1330 nm (GHz-km) |  | 0.88 | 9.95 | 10.35 | 12.71 |
| NA | 0.120 | 0.288 | 0.288 | 0.280 | 0.271 |
| LP01 MFD at 1310 nm (μm) | 9.20 | 9.24 | 9.25 | 9.22 | 9.21 |
| LP01 MFD at 1550 nm (μm) | 10.40 | 10.05 | 10.12 | 10.04 | 10.03 |
| Coupling loss to Single Mode Fiber at 1310 nm (dB) | 0.0 | 0.01 | 0.01 | 0.01 | 0.01 |
| Etendue (μm²) | 1.00 | 54.58 | 56.45 | 48.93 | 43.32 |

TABLE 2A

Relative Refractive Index Characteristics of Illustrative Coupling Fibers

|  | Examples | | | | |
|---|---|---|---|---|---|
|  | 4 | 5 | 6 | 7 | 8 |
| $\Delta_{1max}$ (%) | 12.1 | 1.9 | 1.9 | 1.9 | 1.9 |
| $r_1$ (μm) | 16.06 | 13.76 | 16.13 | 14.38 | 14.52 |
| α | 2.036 | 2.034 | 2.034 | 2.034 | 2.033 |
| $\Delta_3$ (%) | −0.4 | −0.4 | −0.4 | −0.48 | −0.33 |
| $r_1'$ (μm) | 16.57 | 14.24 | 16.69 | 15.00 | 14.91 |
| $r_3$ (μm) | 20.58 | 17.68 | 20.72 | 18.60 | 18.54 |
| $\Delta_4$ (%) | 0 | 0 | 0 | 0 | 0 |
| $r_4$ (μm) | 40.0 | 40.0 | 40.0 | 40.0 | 40.0 |

TABLE 2B

Performance Characteristics of Illustrative Coupling Fibers

|  | Examples | | | | |
|---|---|---|---|---|---|
|  | 4 | 5 | 6 | 7 | 8 |
| EMB at 1270 nm (GHz-km) | 4.75 | 5.53 | 5.90 | 5.49 | 4.61 |
| EMB at 1290 nm (GHz-km) | 9.26 | 11.41 | 11.16 | 10.65 | 7.06 |
| EMB at 1310 nm (GHz-km) | 24.49 | 37.78 | 30.11 | 34.00 | 37.49 |
| EMB at 1330 nm (GHz-km) | 9.02 | 10.39 | 9.06 | 9.88 | 13.65 |
| NA | 0.303 | 0.288 | 0.288 | 0.288 | 0.288 |
| LP01 MFD at 1310 nm (μm) | 9.45 | 8.97 | 9.72 | 9.09 | 9.22 |
| LP01 MFD at 1550 nm (μm) | 10.29 | 9.77 | 10.58 | 9.99 | 10.04 |
| Coupling loss to Single Mode Fiber at 1310 nm (dB) | 0.01 | 0.02 | 0.02 | 0.01 | 0.01 |
| Etendue (μm²) | 74.33 | 49.34 | 67.80 | 53.88 | 54.94 |

TABLE 3A

Relative Refractive Index Characteristics of Illustrative Coupling Fibers

|  | Examples | | | | | |
|---|---|---|---|---|---|---|
|  | 9 | 10 | 11 | 12 | 13 | 14 |
| $\Delta_{1max}$ (%) | 1.9 | 1.9 | 1.9 | 1.9 | 2.1 | 2.1 |
| $r_1$ (μm) | 14.76 | 14.62 | 14.62 | 15.81 | 16.22 | 14.68 |
| α | 2.005 | 2.005 | 2.004 | 2.004 | 2.006 | 2.006 |
| $\Delta_3$ (%) | −0.4 | −0.55 | −0.37 | −0.4 | −0.4 | −0.4 |
| $r_1'$ (μm) | 15.27 | 15.39 | 15.04 | 16.36 | 16.71 | 15.10 |
| $r_3$ (μm) | 18.96 | 19.04 | 18.69 | 20.31 | 20.76 | 18.77 |
| $\Delta_4$ (%) | 0 | 0 | 0 | 0 | 0 | 0 |
| $r_4$ (μm) | 40.0 | 40.0 | 40.0 | 40.0 | 40.0 | 40.0 |

TABLE 3B

Performance Characteristics of Illustrative Coupling Fibers

|  | Examples | | | | | |
|---|---|---|---|---|---|---|
|  | 9 | 10 | 11 | 12 | 13 | 14 |
| EMB at 1530 nm (GHz-km) | 13.56 | 9.63 | 12.44 | 11.65 | 9.70 | 7.24 |
| EMB at 1550 nm (GHz-km) | 33.89 | 24.89 | 43.40 | 36.07 | 26.36 | 31.14 |
| EMB at 1570 nm (GHz-km) | 13.93 | 14.83 | 17.55 | 15.62 | 11.61 | 13.57 |
| NA | 0.288 | 0.288 | 0.288 | 0.288 | 0.303 | 0.303 |
| LP01 MFD at 1310 nm (μm) | 9.24 | 9.19 | 9.18 | 9.56 | 9.41 | 8.56 |
| LP01 MFD at 1550 nm (μm) | 10.07 | 10.02 | 10.02 | 10.42 | 10.28 | 9.78 |
| Coupling loss to Single Mode Fiber at 1550 nm (dB) | 0.04 | 0.04 | 0.04 | 0.03 | 0.03 | 0.05 |
| Etendue (μm²) | 56.61 | 55.54 | 55.52 | 64.90 | 75.85 | 62.14 |

Figure 8:
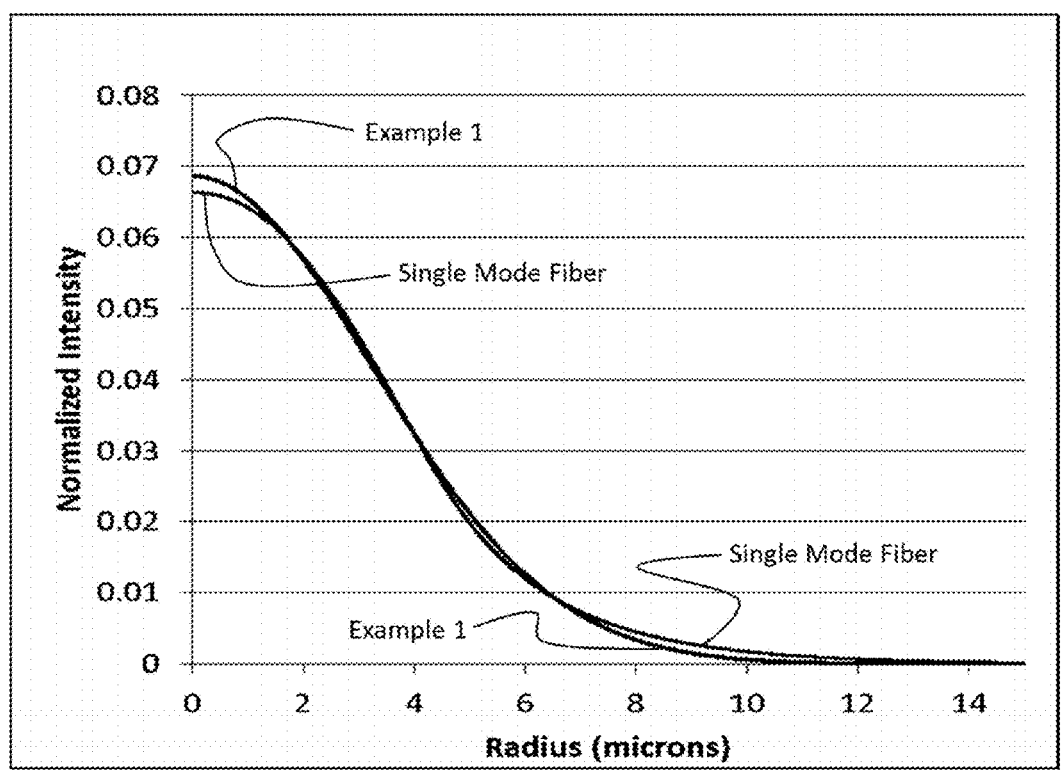
FIG. 8 compares the optical field intensity of the LP01 mode at 1310 nm for a standard single mode transmission fiber and a selected coupling fiber in accordance with the present specification.

FIG. 8 compares the optical field intensity of the LP01 mode at 1310 nm for illustrative Example 1 and the single mode transmission fiber with the relative refractive index characteristics described in in Table 1A. The close match of the optical field distribution for the coupling fiber and single mode transmission fiber indicates that highly efficient coupling between the coupling fiber and the single mode transmission fiber is possible. Based on the overlap integral of optical field intensity, the coupling loss between each of these illustrative coupling fibers and standard single mode fiber is less than 0.1 dB. Another indication of low coupling losses between the coupling fiber and single mode transmission fiber is the comparable mode field diameters, although this is a necessary but not sufficient condition. The mode field diameter of the LP01 mode in the coupling fiber at 1310 nm may be between 8.6 µm and 10.0 µm, or between 8.8 µm and 9.6 µm, or between 8.9 µm and 9.5 µm, or between 9.0 µm and 9.4 µm. The mode field diameter of the LP01 mode in the coupling fiber at 1550 nm may be between 9.6 µm and 11.0 µm, or between 9.8 µm and 10.6 µm, or between 9.9 µm and 10.5 µm, or between 10.0 µm and 10.4 µm. The high etendue of the illustrative coupling fibers further indicates an expectation of low coupling losses between the illustrative coupling fibers and standard multimode transmission fibers and between the illustrative coupling fibers and silicon-photonics transceivers.

Figure 9:
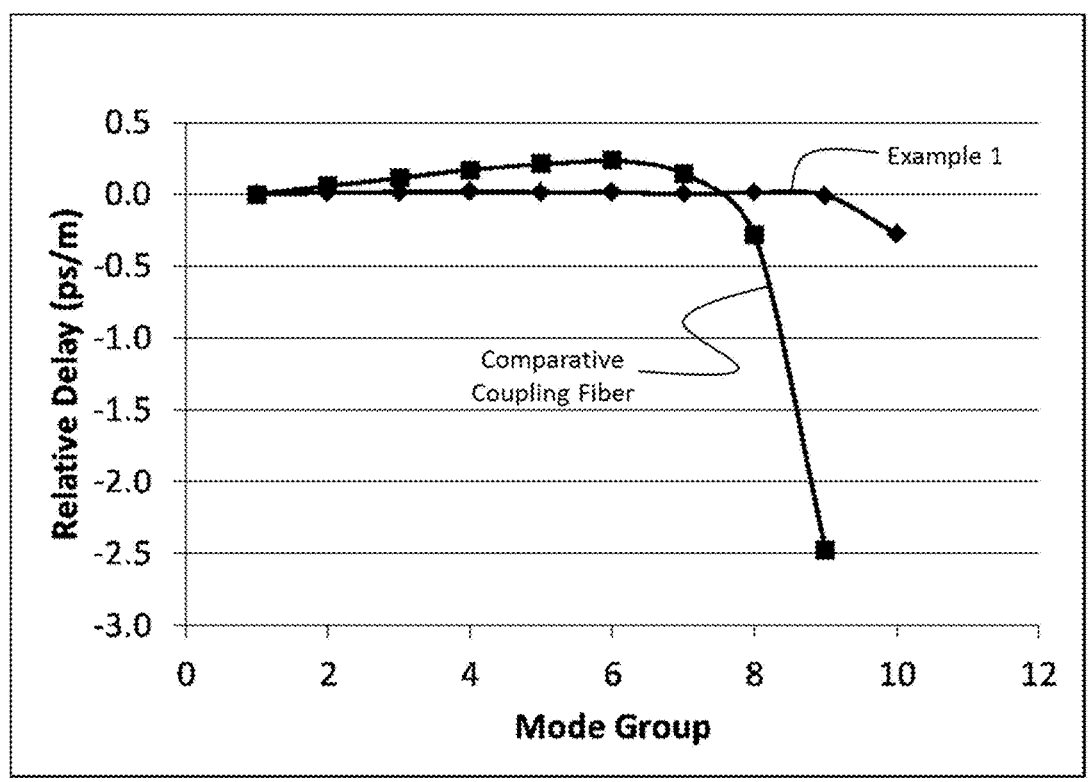
FIG. 9 shows the relative time delay of different mode groups at 1310 nm for a selected coupling fiber in accordance with the present specification and a comparative coupling fiber.

The performance characteristics presented in Tables 1B, 2B, and 3B demonstrate that the illustrative coupling fibers exhibit high bandwidth at the targeted operating wavelengths of 1310 nm (Tables 1B and 2B) and 1550 nm (Tables 3B). Attainment of high bandwidth results from designing the relative refractive index profile to minimize the relative time delay between different mode groups at the targeted operating wavelength. By way of example, FIG. 9 shows the relative time delay (expressed in units of ps/m) of different mode groups at 1310 nm for illustrative Example 1 and the Comparative Coupling Fiber having the relative refractive index characteristics described in Table 1A. The relative time delay of the mode groups is essentially zero for illustrative Example 1 and this leads to the large effective modal bandwidth at 1310 nm specified in Table 1A. In contrast, significant variability in the relative time delay of mode groups was observed for the Comparative Coupling Fiber and an accordingly low effective modal bandwidth at 1310 nm was observed. Comparable results were obtained for the remaining illustrative coupling fibers.

High modal bandwidth at operating wavelengths of 1310 nm or 1550 nm is especially desirable for optical data links because of the favorability of the two wavelengths for optical signal propagation in silica-based optical fibers. The effective modal bandwidth of certain embodiments of the present coupling fibers at 1310 nm is at least 1.5 GHz-km, or at least 2 GHz-km, or at least 3 GHz-km, or at least 4 GHz-km, or at least 8 GHz-km, or at least 16 GHz-km, or in the range from 2 GHz-km 40 GHz-km, or in the range from 4 GHz-km 30 GHz-km, or in the range from 8 GHz-km 20 GHz-km. The effective modal bandwidth of certain embodiments of the present coupling fibers at 1550 nm is at least 1.5 GHz-km, or at least 2 GHz-km, or at least 3 GHz-km, or at least 4 GHz-km, or at least 8 GHz-km, or at least 16 GHz-km, or in the range from 2 GHz-km 40 GHz-km, or in the range from 4 GHz-km 30 GHz-km, or in the range from 8 GHz-km 20 GHz-km.

While not wishing to be bound by theory, it is believed that inclusion of a depressed index cladding region in the relative refractive index profile and the design of the characteristics of the relative refractive index profile specific to the targeted operating wavelength contributes to high bandwidth at the targeted operating wavelength. Unexpectedly high bandwidth as a function of operating wavelength was observed in the present coupling fibers. Tables 1B and 2B, for example, indicate that the illustrative coupling fibers (Examples 1-8) have much higher bandwidth at 1310 nm than at several similar wavelengths (1270 nm, 1290 nm, and 1330 nm). However the bandwidth across the wavelength range from 1270 nm to 1330 nm remains sufficiently high to enable wavelength division multiplexing of two or more optical signals. The minimum effective modal bandwidth of certain embodiments of the present coupling fibers across the 1270 to 1330 nm wavelength range is at least 1 GHz-km, or at least 2 GHz-km, or at least 3 GHz-km, or at least 4 GHz-km, or in the range from 1 GHz-km 20 GHz-km, or in the range from 1 GHz-km 10 GHz-km, or in the range from 2 GHz-km 8 GHz-km.

Table 3B similarly shows that the illustrative coupling fibers (Examples 9-14) have much higher bandwidth at 1550 nm than at similar wavelengths (1530 nm and 1570 nm). However the bandwidth across the wavelength range from 1530 nm to 1570 nm remains sufficiently high to enable wavelength division multiplexing of two or more optical signals. The minimum effective modal bandwidth of certain embodiments of the present coupling fibers across the 1530 nm to 1570 nm wavelength range is at least 1 GHz-km, or at least 2 GHz-km, or at least 3 GHz-km, or at least 4 GHz-km, or in the range from 1 GHz-km 20 GHz-km, or in the range from 1 GHz-km 10 GHz-km, or in the range from 2 GHz-km 8 GHz-km.

In certain embodiments, it is further noted that one or more of the above stated bandwidth performance specifications can be achieved in coupling fibers having high etendue. The etendue of the coupling fiber may be at least 40 µm$^2$, or at least 50 µm$^2$, or at least 60 µm$^2$, or at least 70 µm$^2$, or between 40 µm$^2$ and 80 µm$^2$, or between 50 µm$^2$ and 80 µm$^2$, or between 50 µm$^2$ and 75 µm$^2$, or between 55 µm$^2$ and 80 µm$^2$.

The coupling fiber may include one or more coatings that surround the outer cladding region. The one or more coatings may be directly adjacent the outer cladding region and may extend from the outer radius $r_4$ of the outer cladding region to an outer radius $r_5$. The outer radius $r_5$ of the one or more coatings may be less than 100 µm, or less than 80 µm, or less than 60 µm, or in the range from 55 µm-70 µm, or in the range from 55 µm-65 µm, or in the range from 60 µm-65 µm. In one embodiment, the coupling fiber includes a single-layer coating having an outer radius $r_5$ as noted hereinabove.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the illustrated embodiments. Since modifications, combinations, sub-combinations and variations of the disclosed embodiments that incorporate the spirit and substance of the illustrated embodiments may occur to persons skilled in the art, the description should be construed to include everything within the scope of the appended claims and their equivalents.

What is claimed is:

1. A multimode optical fiber comprising:
   a core region, said core region having an outer radius $r_1$ in the range from 10 µm to 20 µm, and a relative refractive index profile defined by the relationship:

$$\Delta_1(r) = \Delta_{1max}\left[1 - \left[\frac{r}{r_1}\right]^\alpha\right]$$

and
- a cladding adjacent said core region, said cladding including (i) a depressed index cladding region having an inner radius in the range from 11 µm to 20 µm, an outer radius $r_3$ in the range from 14 µm to 24 µm, and a relative refractive index $\Delta_3$ in the range from −0.8% to −0.1%, and (ii) an outer cladding region adjacent said depressed index cladding region having a relative refractive index $\Delta_4$ in the range from −0.2% to 0.2% and an outer radius $r_4$ less than 60 µm;
- wherein said core region and said cladding form a waveguide that supports a fundamental mode and at least one higher order mode at 1310 nm and said optical fiber has an effective modal bandwidth at 1310 nm of at least 3 GHz-km.

2. The multimode optical fiber of claim 1, wherein said outer radius $r_1$ is in the range from 13 µm to 17 µm.

3. The multimode optical fiber of claim 1, wherein said depressed index cladding region has a thickness in the range from 3 µm to 6 µm.

4. The multimode optical fiber of claim 1, wherein said relative refractive index $\Delta_3$ in the range from −0.6% to −0.3%.

5. The multimode optical fiber of claim 1, wherein said effective modal bandwidth at 1310 nm is at least 8 GHz-km.

6. The multimode optical fiber of claim 1, wherein said fiber has a mode field diameter for the LP01 mode at 1310 nm between 8.8 µm and 9.6 µm.

7. The multimode optical fiber of claim 1, wherein said outer cladding region has an outer radius $r_4$ in the range from 35 µm to 45 µm.

8. The multimode optical fiber of claim 1, further comprising a coating adjacent said cladding, said coating having an outer radius $r_5$ less than 80 µm.

9. A multimode optical fiber comprising:
- a core region, said core region having an outer radius $r_1$ in the range from 10 µm to 20 µm, and a relative refractive index profile defined by the relationship:

$$\Delta_1(r) = \Delta_{1max}\left[1 - \left[\frac{r}{r_1}\right]^\alpha\right]$$

and
- a cladding adjacent said core region, said cladding including (i) a depressed index cladding region having an inner radius in the range from 11 µm to 20 µm, an outer radius $r_3$ in the range from 14 µm to 24 µm, and a relative refractive index $\Delta_3$ in the range from −0.8% to −0.1%, and (ii) an outer cladding region adjacent said depressed index cladding region having a relative refractive index $\Delta_4$ in the range from −0.2% to 0.2% and an outer radius $r_4$ less than 60 µm;
- wherein said core region and said cladding form a waveguide that supports a fundamental mode and at least one higher order mode at 1550 nm and said optical fiber has an effective modal bandwidth at 1550 nm of at least 3 GHz-km.

10. The multimode optical fiber of claim 9, wherein said outer radius $r_1$ is in the range from 13 µm to 17 µm.

11. The multimode optical fiber of claim 9, wherein said depressed index cladding region has a thickness in the range from 3 µm to 6 µm.

12. The multimode optical fiber of claim 9, wherein said relative refractive index $\Delta_3$ is in the range from −0.6% to −0.3%.

13. The multimode optical fiber of claim 9, wherein said effective modal bandwidth at 1550 nm is at least 8 GHz-km.

14. The multimode optical fiber of claim 9, wherein said fiber has a mode field diameter for the LP01 mode at 1550 nm between 9.8 µm and 10.6 µm.

15. The multimode optical fiber of claim 9, wherein said outer cladding region has an outer radius $r_4$ in the range from 35 µm to 45 µm.

16. The multimode optical fiber of claim 9, further comprising a coating adjacent said cladding, said coating having an outer radius $r_5$ less than 80 µm.

17. An optical data link comprising:
- a transmitter, said transmitter including a light source, said light source providing light; and
- a multimode optical fiber operably connected to said transmitter, said multimode optical fiber receiving said light from said light source, said multimode optical fiber comprising:
  - a core region, said core region having an outer radius $r_1$ in the range from 10 µm to 20 µm, and a relative refractive index profile defined by the relationship:

$$\Delta_1(r) = \Delta_{1max}\left[1 - \left[\frac{r}{r_1}\right]^\alpha\right]$$

and
- a cladding adjacent said core region, said cladding including (i) a depressed index cladding region having an inner radius in the range from 11 µm to 20 µm, an outer radius $r_3$ in the range from 14 µm to 24 µm, and a relative refractive index $\Delta_3$ in the range from −0.8% to −0.1%, and (ii) an outer cladding region adjacent said depressed index cladding region having a relative refractive index $\Delta_4$ in the range from −0.2% to 0.2% and an outer radius $r_4$ less than 60 µm;
- wherein said core region and said cladding of said first multimode optical fiber form a waveguide that supports a fundamental mode and at least one higher order mode at 1310 nm and said optical fiber has an effective modal bandwidth at 1310 nm of at least 3 GHz-km.

18. The optical data link of claim 17, wherein said light source is a silicon photonics laser or a vertical cavity surface emitting laser.

19. The optical data link of claim 17, further comprising a transmission fiber operably connected to said multimode optical fiber, said transmission fiber receiving said light from said multimode optical fiber.

20. The optical data link of claim 19, wherein said transmission fiber is a multimode transmission fiber.

* * * * *